Patented June 10, 1930

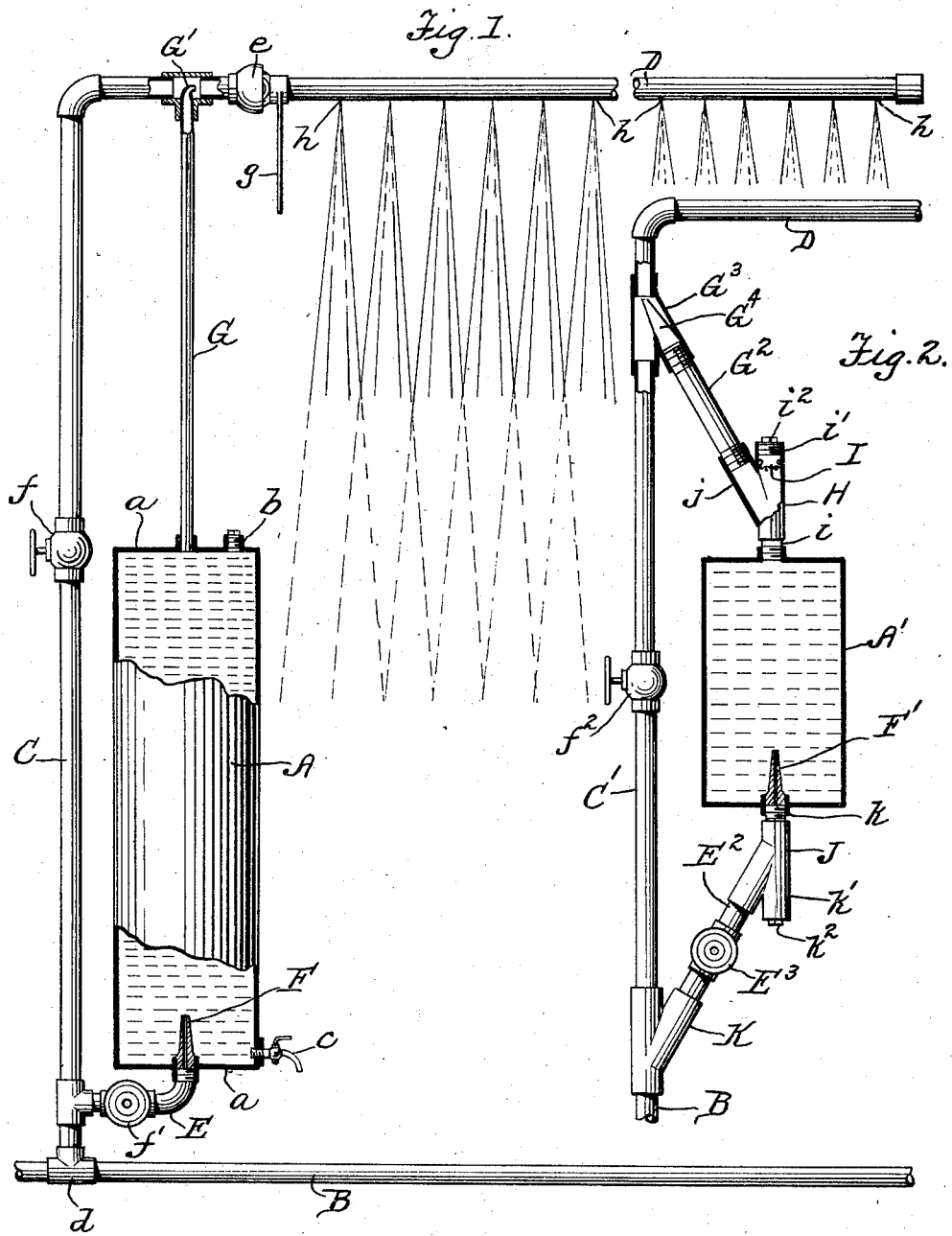

1,763,374

UNITED STATES PATENT OFFICE

GUSTAVE C. C. SCHRADER, OF WOODSTOCK, NEW YORK, ASSIGNOR TO HARRY I. BERNHARD, OF BROOKLYN, NEW YORK; ANNIE MERTINE BERNHARD EXECUTRIX OF SAID HARRY I. BERNHARD, DECEASED

APPARATUS FOR DISTRIBUTING FERTILIZER IN SOLUBLE CONDITION

Original application filed April 13, 1922, Serial No. 552,418. Divided and this application filed April 29, 1927. Serial No. 187,666.

My invention is an apparatus for distributing fertilizer in soluble condition, the same being a division of a prior application for a method filed April 13, 1922, Serial No. 552,418, now Patent No. 1,630,768, patented May 31, 1927.

The object in view is to provide mechanism for the application of a clear saturated solution of manurial salts in the quantity proper for each installation and application of the solution, and also to provide a safe solution to be applied to growing plants in a manner to preclude an injurious effect upon such plants.

It is common practice in fertilizing growing plants to use manurial salts in a natural or crude state, with the result that the impurities present in the salts in a natural condition are carried in solution, and when such solution is distributed by an apparatus of one form or another, such impurities and the insoluble agents have a tendency to, and do actually, obstruct and clog up the apertures, screens, and nozzles of the distributing mechanism.

It is desirable that fertilizing agents be supplied in liquid form and diluted by the addition of water to render safe the application of such fertilizer in such dilute form to the growing plants, and it is desirable, also, that such diluted liquid fertilizer be distributed and applied at frequent intervals, varying from ten days to twenty days.

A further objection to the distribution of soluble fertilizer as heretofore practiced is that no adequate provision is made for feeding either a predetermined quantity of the manurial salts, or to feeding a complete fertilizer embodying as essential ingredients the elements of a nitrate, a potash and a phosphate which are deemed essential for the nourishment and propagation of growing plants, nor has adequate provision been made for controlling the rate of dilution for a given installation of the manurial salts at and during the period of distribution and irrigation. On the contrary, such prior systems depend upon the manipulation of valves for effecting the quantity of fertilizer solution supplied to the water as diluting agent, thereby endangering the growing crops by feeding fertilizer in excess quantity thereto.

According to my method as disclosed in my prior application, there is employed a saturated solution of manurial salts of nitrate of soda, muriate of potash, and acid phosphate, such elemental agents being high grade salts, and the resulting solution being clarified by any desirable procedure, such as by decanting, for the elimination of sediment or precipitates so as to attain a clear solution, and this solution is highly diluted by the admixture therewith of water, such dilution of the saturated solution being progressive to the extent that while at the start of the distributing operation the ratio is as one part of the saturated solution to one hundred parts of water, such ratio quickly diminishes, so that at the end of a short interval of time, say thirty (30) minutes, only clear fresh water flows through the distributing mechanism.

The proceduce supplies a fertilizer agent to growing crops without the possibility of an injurious effect thereon, for the reason that tender plants or rootlets cannot be injured by supplying the highly diluted or "thin" solution even at the starting of the distributing operation during which the liquid carries the highest percentage of the manurial salts in solution, as after a few minutes interval following the beginning of the distribution, the liquid becomes progressively more dilute until toward the exhaustion of the charge of the saturated solution only clear water passes through the distributer, with the result that the surfaces in contact with the saturated solution are flushed by the flow of water, thereby cleaning the apparatus by the water supplied for irrigating purposes to the growing crop. By using a clear saturated solution of manurial salts, there is no residue that will tend to obstruct and clog the nozzles of the irrigating system.

The drawing hereto annexed and forming a part hereof illustrates constructionally and diagrammatically my improved apparatus, as follows:

Figure 1 is an elevation partly in section, and

Figure 2 is a sectional view of another form of the apparatus.

Referring to Figure 1 of said drawing, A designates a tank of suitable capacity, closed at its ends by suitable heads, $a$. The upper head is provided with a charging opening, $b$, adapted to be tightly closed by appropriate means, said opening making provision for the introduction into the tank of a clear saturated solution of manurial salts. At or near the lower part, said tank is provided with a suitable drain cock, $c$.

B is the feed pipe for the flow therein of clear water from any desirable source of supply, and C is an upright pipe extending alongside the tank A, and to a suitable distance above the tank, said upright pipe being coupled at $d$ to the feed pipe B.

D is the distributor of any approved construction, the same being shown as coupled at $e$ with the branch pipe C in order that said distributor may be shifted or oscillated as desired for the distribution of the liquid upon the growing plants. The upright pipe is provided with a stop cock, $f$, intermediate its ends for shutting off the flow of water through it when the apparatus is out of service, or to be shifted from one place to another, but normally this stop cock is opened to full capacity for establishing the flow of water in a certain determined volume.

The coupling $e$ intermediate the branch pipe C and distributing pipe D may be of the ball and socket variety shown in the drawing, with a view to permitting the attendant to operate the distributing pipe D by pressure applied to the handle $g$, whereby the pipe D may be given an oscillating movement in a horizontal plane, or substantially so, while the flow of liquid continues uninterruptedly through pipes B, C, D, to distribute the liquid as required. As shown, the distributing pipe D is provided with a row of outlets on the underside thereof, said outlets being shown as apertures $h$, although nozzles may be fixedly attached to the pipe.

Water is supplied to the tank from the branch pipe C through a connection intermediate said pipe and the bottom of the tank, whereby the inflowing water displaces the saturated solution. Said connection is shown as a short pipe E and a nozzle F, one end of the short pipe being attached to the branch pipe, and the other end coupled to the bottom head of said tank, said short pipe having a stop cock $f'$ adapted normally to be wide open for the full and free flow of water or to be closed for shutting off the water flow.

The nozzle F is coupled to the delivery end of the short pipe and it extends upwardly within the tank substantially centrally thereof. No provision is made for shutting off the flow of water admitted by the short pipe and the nozzle, such as by effecting a variation in the volume of water by manipulation of the stop cock; but, on the contrary, the volume of water admitted to the tank for displacing the saturated solution is mathematically determined by providing the nozzle F with an outlet of a predetermined area, which area of the nozzle remains constant so that the rate of inflow of water into the tank is the same at all times, the stop cock $f'$ being fully opened.

G is a connecting pipe extending from the upper tank head to the branch pipe, said pipe G conducting the saturated solution from the tank to the distributing pipe. As shown, the lower end of pipe G is fixedly attached to the tank, whereas the upper end of said pipe G is provided with a discharge shown as a nozzle $G'$ which enters the passage in the pipe C so as to feed the saturated solution into the middle of the column of water flowing from pipe C into the distributor D for effecting the desired dilution of the saturated solution by admixture with the water.

The saturated solution is prepared from appropriate manurial salts, and although the salts utilized and the proportions used may be modified, I find that good results are obtainable according to the formula:—

|  | Pounds |
|---|---|
| Nitrate of soda | 50 |
| Acid phosphate | 100 |
| Muriate of potash | 50 |

These materials are placed within a vessel with sufficient water—forty (40) gallons—to produce a saturated solution. The solution should be well stirred from the bottom of the vessel at frequent intervals for a day or so, and then should be left to settle, and only the clear saturated solution is used for distribution. Another way of preparing the solution is to dissolve the acid phosphate first in about forty (40) gallons of water, stir well from the bottom of the vessel, and let settle, which allows the gypsum and insoluble phosphate to settle to the bottom, the gypsum being a valuable ingredient to be used on the land in preparing the soil. The clear phosphoric acid solution thus formed will take up the fifty (50) lbs. of nitrate of soda, and take up, also, the fifty (50) lbs. of muriate of potash, making a nearly complete plant food for general use.

When fertilizing the crop, the saturated solution in a clear condition is taken from the mixing vessel, and with the drain cock $c$ and stop cocks $f$, $f'$, closed, the solution is poured into vessel A through charging opening $b$.

The apparatus is now ready for use, whereupon stop cocks $f$, $f'$, are fully opened, the effect of which is to establish the flow of water through pipes B, C, to the distributor D and to the bottom of the tank. The water thus supplied to the tank displaces the saturated solution from said tank, and induces the upward flow of said solution through pipe G into the water flowing through pipe C and distributor D, the ratio of solution to water at the beginning of the distribution being as one to one hundred. The continued flow of water through nozzle F into the tank dilutes the saturated solution progressively, and at the end of the distribution only clear water flows through the tank, with the result that the interior surfaces of the pipe, valves and tank are flushed and cleansed by the water flowing through the same, thus obviating the necessity for cleaning the parts and the distribution of the water tending to prevent any solution remaining on the leaves of growing plants.

A modified form of the solution-containing tank and its connections is shown in Figure 2, wherein the tank A' is used in connection with certain Y-fittings to provide for the assemblage to the vertical pipe C'. A Y-shaped fitting H is coupled at $i$ to the upper part of the tank, and one branch $i'$ of this fitting carries a screen I for filtering the saturated solution when charging said solution into the tank, the upper part of this branch of said fitting H being closed by a plug or cap, $i^2$. The other branch $j$ of the Y-fitting H is connected to an inclined pipe $G^2$ attached to a Y-fitting $G^3$ provided on the vertical pipe C' at a proper distance below the perforated distributing pipe, and this inclined pipe $G^2$ has an outlet $G^4$ in the form of a short piece of pipe positioned for the delivery of the solution into the middle of the pipe A' for effecting the admixture of the solution with the water adapted to flow within the tank A', the stop cock $f^2$ being open. The pipe $G^4$ obstructs the pipe a little to secure a better flow into the apparatus without having to partly close the main valve $f^2$.

A Y-fitting J is coupled at $k$ at the bottom of the tank, said fitting having the nozzle F' for feeding the water in the required volume to the bottom part of the tank A'. A branch $k'$ of this Y-fitting J is closed by a plug $k^2$ to serve as a drain cock for the tank A', and to the other branch of said Y-fitting is connected an inclined pipe $E^2$ connected to a Y-fitting K, said inclined pipe $E^2$ having the stop cock $E^3$. The inclined pipes referred to insure an easier flow of water without much friction, there being no abrupt bends in the line of liquid flow.

Although the size and proportion of parts may be modified within the skill of the engineer, it may be stated that an average greenhouse installation involves the distribution of water to an extent of about eight (8) feet on either side of a pipe line, so that a hundred foot length would be sufficient for irrigating seven hundred (700) square feet on each side and requires a one and one-half gallon tank charged with sixty (60) oz. of nitrate and potash salts in saturated phosphoric acid solution obtained from one hundred and twenty (120) oz. of acid phosphate to be run out in about thirty (30) minutes time on each side.

My apparatus provides a charge container in the form of a tank and connections, whereby a charge of the required quantity for a given installation may be supplied so that the proper amount only of the fertilizer can be distributed at the desired periods, say twelve (12) or twenty (20) days. My charge containing tank and its fittings may be used in connection with the distributor shown, or in connection with other desired forms of distributing mechanisms.

Having thus fully described the invention, what I claim as new and desire to secure by Letters Patent is:

1. An apparatus for distributing fertilizer in soluble condition embodying a feed pipe, a distributing member having a direct connection with said feed pipe, a tank for containing a fertilizer solution, a fluid connection between said feed pipe and said tank, said fluid connection including a reducing nozzle at one end thereof and located inside the tank at one end thereof and operable for feeding liquid in reduced quantity to the tank as compared with the volume of fluid passing from said feed pipe to the distributing member, and a fluid connection from said tank to the distributing member whereby a fertilizer solution in diluted condition may flow from the tank to the distributing member concurrently with the flow of liquid from the feed pipe directly to the distributing member.

2. An apparatus for distributing fertilizer in soluble condition embodying a feed pipe, a standpipe connected therewith, a distributing pipe movably connected to the standpipe, said movable connection allowing said distributing pipe to be shiftable relatively to said stand pipe, a tank having means for charging the same with a fertilizer solution, a fluid connection from the stand pipe to the tank, said fluid connection including a reducing nozzle operable for restricting the flow in volume of fluid into the tank as compared with the volume of fluid flowing from the stand pipe to the distributing member, and a second fluid connection, the same extending from the tank to the stand pipe and said second fluid connection having a reducing nozzle operable for restricting the volume of diluted fertilizer solution adapted to flow from the tank through said second connection into the fluid flowing from the stand pipe to the distributing pipe.

3. An apparatus for distributing fertilizer in soluble condition comprising a feed pipe, a standpipe connected therewith, a perforated distributing pipe, a ball and socket joint connecting the distributing pipe with said standpipe whereby the distributing pipe is movably mounted, a tank, a fluid connection from the standpipe to the tank said fluid connection including a reducing nozzle connected to the end of the said fluid connection and being located in the tank at one end thereof, said reducing nozzle being operable for restricting the flow in volume of fluid into the tank as compared with the volume of fluid flowing from the standpipe to the distributing member, and a second fluid connection connecting the other end of the tank and the standpipe, said second fluid connection having a reducing nozzle at one end thereof and in the said standpipe for restricting the volume of diluted fertilizer solution adapted to flow from the tank through said second fluid connection into the fluid flowing from said standpipe to the distributing pipe.

In testimony whereof I have hereto signed my name this 26th day of April, 1927.

GUSTAVE C. C. SCHRADER.